(12) United States Patent
Lindsay

(10) Patent No.: US 6,357,707 B1
(45) Date of Patent: Mar. 19, 2002

(54) MOUNTING CLAMP

(76) Inventor: Jimmy W. Lindsay, Rte. One, Box 1173, Red Oak, OK (US) 74563

( * ) Notice: Subject to any disclaimer, the term of this patent is extended or adjusted under 35 U.S.C. 154(b) by 0 days.

(21) Appl. No.: 09/479,024

(22) Filed: Jan. 7, 2000

(51) Int. Cl.⁷ .............................................. F21V 21/00
(52) U.S. Cl. .............................. 248/226.11; 248/230.4; 362/523
(58) Field of Search ....................... 248/226.11, 229.24, 248/230.1, 230.5, 231.85; 362/427, 505, 430, 396, 431, 506, 382

(56) References Cited

U.S. PATENT DOCUMENTS

| | | | | |
|---|---|---|---|---|
| 128,522 A | * | 7/1872 | Andrews | 248/226.11 |
| 632,858 A | * | 9/1899 | Waibel et al. | 248/230.5 |
| 1,577,937 A | | 3/1926 | Slusser | |
| 2,239,015 A | * | 4/1941 | Powell | 362/528 |
| 2,886,277 A | * | 5/1959 | Boham et al. | 248/205.5 |
| 4,595,163 A | | 6/1986 | Guggiari | 248/229 |
| 4,616,797 A | * | 10/1986 | Cramer | 248/227.4 |
| 4,692,845 A | | 9/1987 | Widhalm | 362/80 |
| 4,711,422 A | * | 12/1987 | Ibanez | 248/515 |
| 4,714,223 A | | 12/1987 | Kamaya | 248/291 |
| D308,116 S | | 5/1990 | Vandergriff | D26/149 |
| 5,144,546 A | * | 9/1992 | Burdi | 362/191 |
| 5,305,978 A | * | 4/1994 | Current | 248/230.4 |
| 5,515,246 A | * | 5/1996 | Maglica | 362/473 |
| 5,800,099 A | * | 9/1998 | Cooper | 408/1 R |
| 5,845,983 A | * | 12/1998 | Schmidt | 362/523 |

FOREIGN PATENT DOCUMENTS

SE     WO 95/01264     12/1995

* cited by examiner

Primary Examiner—Anita King
(74) Attorney, Agent, or Firm—Rudolf O. Siegesmund

(57) ABSTRACT

An apparatus for affixing an auxiliary light to the pipe of a grill guard by clamping a mounting plate to the pipe and affixing the lamp to the plate.

1 Claim, 2 Drawing Sheets

MOUNTING CLAMP

BACKGROUND OF THE INVENTION

1. Field of the Invention

The present invention relates to an apparatus for affixing an auxiliary lamp to the grill guard of an automobile, truck or utility vehicle.

2. Description of the Prior Art

Auxiliary lamps are commonly mounted on automobiles, trucks and utility vehicles to augment the illumination for driving on unlighted roads, for off-road travel and for driving during conditions of adverse visibility such as rain or fog. U.S. Pat. No. 4,692,845 discloses a bracket for mounting an auxiliary light on the roll bar of a truck where the bracket allows the light to be flipped over for use in forward and rearward illumination. U.S. Pat. No. 4,714,223 discloses an improved mounting device for affixing a fog lamp to a vehicle bumper. U.S. Pat. No. 4,595,163 discloses a mounting bracket comprising two serrated jaws brought together to engage a vehicle bumper by a screw clamp.

Many vehicles now come equipped with grill guards. Owners of utility vehicles in particular often choose the option of a heavy duty grill guard to protect the radiator during off road travel. The grill guard affords an opportunity for mounting auxiliary lights on a stable platform at a variety of locations. Moreover, the prior art identifies mounting the lights on the bumper as an area where lights are routinely impacted and must have mounts that can allow the light to deflect with the impact. Mounting lights on the grill guard allows positioning of the lights above the bumper. What is needed beyond the prior art is a mounting clamp designed to allow easy attachment of a driving and/or fog light to the grill guard of a truck. What is further needed beyond the prior art is a mounting clamp that does not require any drilling or attachment directly to the vehicle body.

SUMMARY OF THE INVENTION

The present invention meets the needs and solves the problems identified above by providing an apparatus that clamps around the pipe of the grill guard. The clamp has a protruding bar for mounting the lamp.

The foregoing and other objects, features and advantages of the invention will be apparent from the following more particular description of a preferred embodiment of the invention, as illustrated in the accompanying drawings wherein like reference numbers represent like parts of the invention.

DESCRIPTION OF PREFERRED EMBODIMENTS

Figure 1:
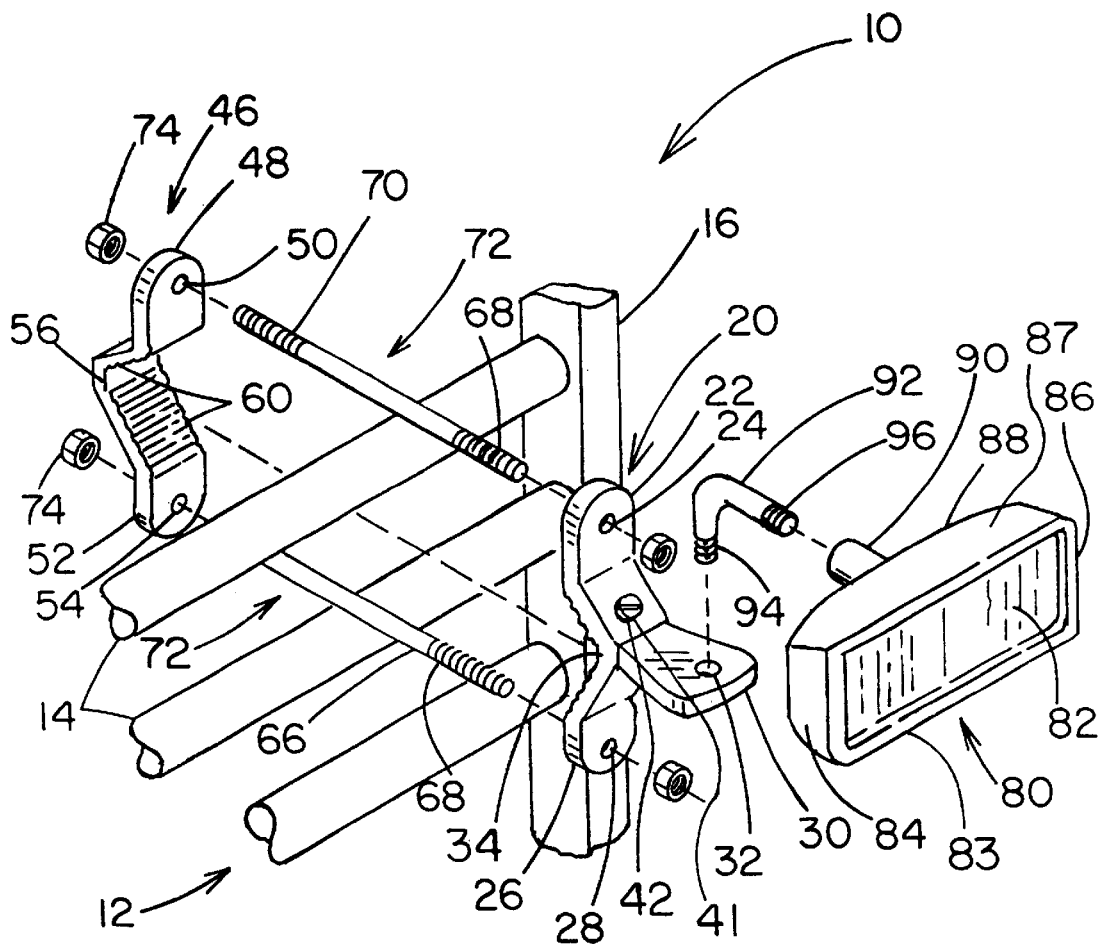
FIG. 1 is an exploded view of the apparatus.

In FIG. 1, auxiliary light system 10 is shown comprising grill guard 12, front clamp 20, rear clamp 46, rods 72, mounting rod 92 and auxiliary light 80. Grill guard 12 has side support 16 and a plurality of pipes 14 fixedly engaged to side support 12. The view of grill guard 12 is truncated so that the left side of grill guard 12 is not shown. The left side of grill guard 12 is identical to side support 16 as shown. Rear clamp 46 has rear clamp first end 48 and rear clamp second end 52. Rear clamp first end 48 has hole 50 for receiving a rod 72. Rear clamp second end 52 has hole 54 for receiving a rod 72. Rear clamp 46 has rear clamp center section 56 which is shaped with two wings having serrated edges 60. Rear clamp first end 48 and rear clamp second end 52 are vertical and generally planar. Front clamp 20 has front clamp first end 22 and first clamp second end 26. Front clamp first end 22 has hole 24 for receiving a rod 72. Front clamp second end 26 has hole 28 for receiving a rod 72. Front clamp 46 has front clamp center section 34 which is shaped with two wings having serrated edges 60. Front clamp first end 22 and front clamp second end 26 are vertical and generally planar. Front clamp 20 has plate 30 fixedly engaged to the center portion of front clamp center section 34 at the apex of the two wings of front clamp center section 34. Plate 30 is generally perpendicular to the plane of front clamp first end 22 and front clamp second end 26. Plate 30 has plate hole 32 for receiving mounting rod 92. Mounting rod 92 has mounting rod first end 96 and mounting rod second end 94. In the preferred embodiment, plate hole 32 is threaded and mounting rod second end 94 is threaded for threaded engagement in plate hole 32. Front clamp center section 34 has front clamp center section hole 41 for receiving ground screw 42. Rear clamp 46 and front clamp 20 are affixed to grill guard 12 by placing rear clamp 46 behind a pipe 14 and front clamp 20 in front of the same pipe 14 and passing a rod 72 through front clamp first end hole 24 and rear clamp first end hole 50 and passing a rod 72 through front clamp second end hole 28 and rear clamp second end hole 54 and securing nuts 74 to rod second end 70 and rod first end 68. Nuts 74 are tightened until rear clamp 46 and front clamp 20 are fixedly engaged to pipe 14. Ground screw 42 is shown inserted in front clamp center section hole 41. Ground screw 42 and front clamp center section hole 41 are optional features. Mounting rod 92 has mounting rod first end 96 which is threaded for engagement with auxiliary light 80. Auxiliary light 80 has lens 82, casing top 87, casing bottom 83, casing left side 84, casing right side 86 and casing rear 88. Casing rear 88 has socket 90 extending from casing rear 88. Socket 90 has central hole (not shown) which is threaded for receiving threaded end 96 of mounting rod 92.

In the preferred embodiment front clamp 20 and rear clamp 46 are manufactured from cast steel and may be chrome finished. Front clamp 20 and rear clamp 46 are approximately 3 inches long and 1 inch wide and the "v" in front clamp center section 34 and rear clamp center section 56 will fit around a 1 inch to 1 and ½ inch diameter pipe 14 of grill guard 12. The front clamp first end holes, front clamp second end holes, rear clamp first end holes and rear clamp second end holes are approximately 17/64 inches in diameter for receiving rods of size that allows free passage through the holes. Plate 30 is approximately 1 inch wide, 1 and ½ inch long, and 11/32 inches in depth. Plate hole 32 is approximately 29/64 inches in diameter. The center of plate hole 32 is approximately ½ inch from the outer end of plate 32.

Figure 2:
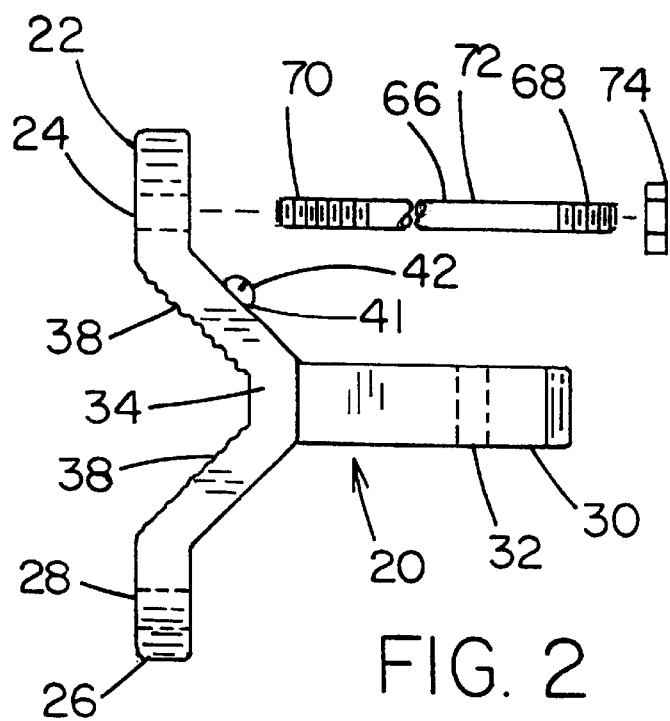
FIG. 2 is a left side view of the front clamp section.

FIG. 2, depicts a side view of front bracket 20. Front bracket 20 has plate 30 and plate hole 32. Plate 30 is fixedly engaged to apex of front bracket center section 34. Serrated edges 38 are located on the opposite side of center section 34 from plate 30. Rod 72 is shown positioned for insertion in front bracket first end hole 24.

Figure 3:
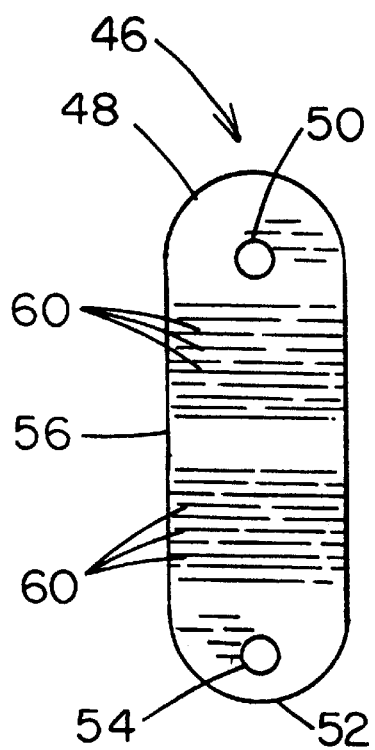
FIG. 3 is a rear view of the front clamp section.

FIG. 3 shows a rear view of rear bracket 46 with rear bracket first end hole 50 and rear bracket second end hole 54 for receiving rods 72 (not shown in FIG. 3). Rear bracket 46 has serrated edges 60. Comparing FIG. 2 and FIG. 3 it can be seen that rear bracket 46 and front bracket 20 are the same with the exception that front bracket 20 has plate 30 affixed to center section 34 extending outwardly in a direction perpendicular to the plane of front bracket first section 22 and front bracket second section 26.

Figure 4:
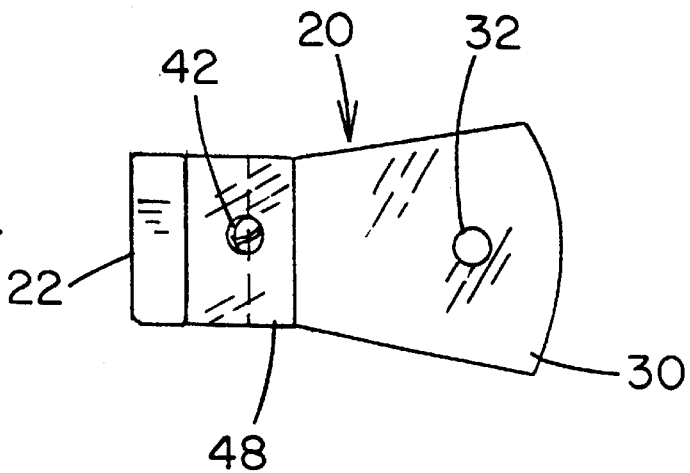
FIG. 4 is a top view of the front clamp section.

FIG. 4 depicts plate 30 as seen from above. Plate hole 32 extends outward away from center section 34 (not shown). Tightening screw 42 is shown located in the general center of the top sloping section of center section 34. Plate 30 may be wider at the outer end that at the juncture with front bracket center section 34.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

I claim:

1. An apparatus for affixing an auxiliary lamp to a pipe of a grill guard of an automotive vehicle, comprising:

a front clamp having a plate and a plurality of front clamp holes;

a rear clamp having a plurality of rear clamp holes;

a plurality of rods having a rod first end and a rod second end;

a plurality of nuts;

a mounting rod removably engaged to said plate;

wherein the mounting rod has a mounting rod second end for threaded engagement with a plate hole in said plate and a mounting rod first end adapted for attachment to the auxiliary lamp;

wherein said rod first end and said rod second end are threaded for receiving said nuts;

wherein said front clamp and said rear clamp are adapted to be positioned on opposite sides of said pipe;

wherein said rods are passed through said front clamp holes and said rear clamp holes;

wherein said nuts are rotatably affixed to said rod first ends and said rod second ends;

wherein said front clamp, said rear clamp, said rods and said nuts are adapted for fixed engagement to said pipe; and wherein said front clamp and said rear clamp have a pipe side and wherein said pipe side has serrated edges.

* * * * *